United States Patent [19]

Kim et al.

[11] Patent Number: 4,954,615
[45] Date of Patent: Sep. 4, 1990

[54] PROCESS FOR DRYING CARBOXYL CONTAINING POLYMERS OF VINYLIDENE MONOMERS

[75] Inventors: Jong S. Kim, Seongnam; Ki T. Lee; Dong B. Shu, both of Pohang, all of Rep. of Korea

[73] Assignee: Korea Steel Chemical Co., Ltd., Seoul, Rep. of Korea

[21] Appl. No.: 208,414

[22] Filed: Jun. 17, 1988

[51] Int. Cl.$^5$ .............................................. C08F 6/24
[52] U.S. Cl. .................................... 528/501; 528/503; 34/10
[58] Field of Search ................... 528/501, 503; 34/10; 165/2

[56] References Cited
U.S. PATENT DOCUMENTS
4,126,743 11/1978 Shiomura et al. ................... 528/503

OTHER PUBLICATIONS

Hackh's Chemical Dictionary (4th ed.), McGraw-Hill, Inc., N.Y., 281, 1969.
Textbook of Polymer Science, Billmeyer, Jr., 2d ed, Wiley-Interscience, N.Y., 208–09, 1962.

Primary Examiner—Joseph L. Schofer
Assistant Examiner—F. M. Teskin

[57] ABSTRACT

A slurry mixture comprising a carboxyl containing polymer of vinylidene monomers having at least one terminal methylene group and a polymerizing solvent is effectively dried by way of: passing said mixture through one or a plurality of preheated double pipe heat exchangers in order to produce a two-phase mixture comprising the pulverized polymer and the vaporized solvent; and, then, feeding said two-phase mixture to a rotary vacuum dryer in order to further remove and separate the vaporized solvent from the powdery polymer.

21 Claims, 1 Drawing Sheet

PROCESS FOR DRYING CARBOXYL CONTAINING POLYMERS OF VINYLIDENE MONOMERS

BACKGROUND OF THE INVENTION

Various types of carboxyl containing polymers of vinylidene monomers with at least one terminal methylene group are disclosed in, e.g., U.S. Pat. No. 4,267,103 (Cohen, 1981). Such polymers may be homopolymers, or copolymers with other vinylidene monomers, of unsaturated polymerizable carboxylic acids such as acrylic acid, maleic acid, itaconic acid and the like. Often copolymers of these acids are crosslinked with small amounts of cross-linking agents. These polymers, especially in the form of their salts, absorb large quantities of water or solvent and, therefore, are useful as, for example, suspending agent, gelling agent or rheological properties controlling agent.

The polymerization of the afore-mentioned monomers is normally carried out in the presence of an organic medium which is a solvent for the monomers but is a non-solvent for the polymers. The organic solvent which may be employed in such polymerization process includes: benzene, xylene, tetralin, hexane, heptane, carbon tetrachloride, methyl chloride, ethyl chloride and the like.

Generally, in this type of solvent polymerization, polymers begin to precipitate from the solution shortly after the initiation; and, as the polymerization progresses, they aggregate in a thick slurry form, retaining large quantities of solvent.

A common problem in such polymerization process resides in the inherent difficulty of separating the solvent from the polymer product. A usual separation method such as centrifugation or filtration may not be effective due to the lack of sufficient density difference between the solid rich phase and the solvent or due to the insufficient development of the particle size to utilize a filter. As a result, a direct drying system such as a rotary vacuum dryer is commonly used to separate and recover the solvent from the polymer.

As is well known, however, a vacuum drying system, when used to dry a slurry mixture containing a large quantity of solvent, e.g., in excess of 50% by weight, requires a long drying time. Such a lengthy drying process is not only less economical but also entails a number of undesirable side effects. The polymers, when exposed to a high temperature for a prolonged duration, become vulnerable to thermal degradation or glassification; and may coagulate in various non-uniform sizes of particles. Furthermore, such a conventional drying system, regardless of the length of the drying time, is often unable to remove the solvent residues which are trapped in the interstices of the polymeric particles. Since most of these organic solvents are known to be carcinogenic, the industry has been searching for a viable method capable of producing a polymeric product containing a commercially acceptable level of solvent residue.

SUMMARY OF THE INVENTION

In accordance with the present invention, it has now been discovered that carboxyl containing polymers of vinylidene monomers with at least one terminal $H_2O<$ group in their slurry form can be effectively separated and recovered from their polymerizing solvent by way of employing a preheated double pipe heat exchanger, or a plurality thereof, operating under a number of "optimally" controlled variables. Specifically, the polymeric mixture in a slurry form produced in, e.g., an autoclave is fed into a preheated double pipe heat exchanger or a plurality of such double pipe heat exchangers arranged in parallel, the number of said plurality is determined as a function of the desired production rate of the polymers, wherein the solvent present in the polymeric product mixture is violently evaporated and separated, resulting in the separation of the product mixture into a gaseous phase (vaporized solvent) and a powdery mass (pulverized polymer product). Such two-phase mixture of the vaporized solvent and the pulverized polymeric product is then transferred to a conventional separator, e.g., a rotary vacuum dryer for final segregation and recovery of the gaseous solvent from the powdery polymer.

Representative of the polymers which may be successfully dried by employing the present inventive process include linear and cross-linked polyacrylic acid, carboxy polymethylene, polymethacrylic acid and the like. Typical of the solvents which may be employed for the synthesis of such polymers are benzene, xylene, toluene, hexane, heptane, carbon tetrachloride, methylene chloride, methanol, trichlorotrifluoroethane also known under the trademark of Freon, 113 (see CRC Handbook of Chemistry and Physics, 65th Edition 1984–1985, Edited by R. C. Weast et al., page E-34) and dichloroethane, preferably, benzene, toluene, n-hexane, n-heptane, methylene chloride, methanol, trichlorotrifluoroethane also known under the trademark of Freon 113 and dichloroethane, and, more preferably, benzene, n-hexane, methanol, trichlorotrifluoroethane also known under the trademark of Freon 113 and dichloroethane.

The polymeric mixture in its slurry form may be fed from the reactor into the preheated double pipe heat exchanger(s) by way of employing various suitable transportation means such as a pump. To minimize any plugging or maintenance problems in such transportation means, e.g., a pump, however, it is preferred to apply directly to the reaction mixture an elevated level of pressure in a range from 0.5 $kg/cm^2$ to 5 $kg/cm^2$, preferably from 1 $kg/cm^2$ to 3 $kg/cm^2$ more preferably from 1 $kg/cm^2$ to 2.5 $kg/cm^2$. An inert gas such as nitrogen may be employed to produce the required level of pressure. The double pipe heat exchanger or jacketed tubular heat exchanger is heated at a temperature close to or slightly above the glassification temperature (Tg) of the polymer, i.e., Tg+25° C., preferably, Tg+20° C., more preferably, Tg+15° C.

The size of the inner diameter of the tubular heat exchanger is one of the most critical parameters. Should the inner diameter be chosen in a larger size than the optimum, then there will be an insufficient area of effective drying surface; and, in the case of too small a size, the inlet area of the inner pipe becomes clogged, crippling the entire flow process. It has now been discovered that a pressurized introduction of the polymeric slurry into a preheated double pipe heat exchanger having the inner diameter ranging from ⅜" to 1¾", preferably from ½" to 1", more preferably from ½" to ¾" and having the length not shorter than 20 meters, preferably from 20 meters to 60 meters, more preferably from 25 meters to 40 meters, produces a fully developed turbulent flow, facilitating the instant transfer of heat, which is consumed to vaporize the liquid solvent. Such rapid change of phase in the solvent from liquid to gas produces an instant volumeric expansion, accelerating the turbulent flow of the mixture. Such explosive turbulence engenders a powerful and chaotic collision of the polymeric particles among themselves and/or against the tubular wall, which phenomenon may be termed as a self-grinding effect, producing a finely pulverized polymeric powder in the typical particle size of 5 to 20 μ. Such selfgrinding process further frees and removes the solvent residues remaining in the voids of the polymeric particles, enabling the production of a polymeric product with a minimum level of solvent content.

DETAILED DESCRIPTION OF THE PREFERRED EMBODIMENTS

Figure 1:
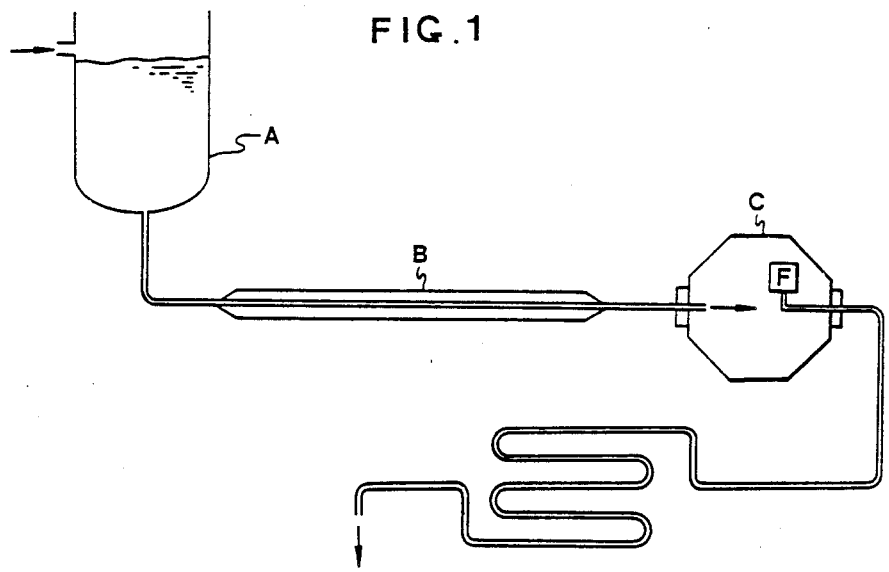
FIG. 1 is a schematic diagram showing the flow of the polymeric product mixture from a batch reactor to a rotary vacuum dryer through a double pipe heat exchanger.
Figure 2:
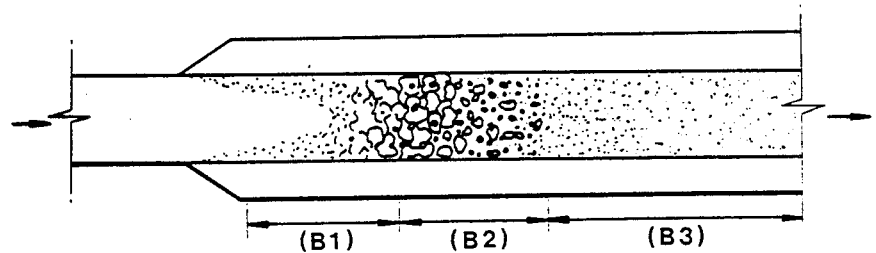
FIG. 2 illustrates the solvent separation process as the polymer-solvent mixture passes the quick boiling zone, the segregation zone and the pulverizing zone, which are artificially drawn inside the tubular heat exchanger.

Upon the completion of polymerization in a batch reactor (A), the solvent-rich product slurry, e.g., having the benzene content in excess of 80% by weight, is sent to one (B), or an array of double pipe heat exchangers, heated at a temperature close to Tg of the polymeric product, having the inner diameter of, e.g., $\frac{3}{4}''$, and the length of about 30 m.

When the polymeric mixture in its slurry form passes the first segment of the tubular heat exchanger, which may be artificially termed as the quick boiling zone(B1), upon its contact with the heated pipe wall, the liquid solvent instantly vaporizes. Such vaporization together with the influx pressure aids the prevention of the blockage of the pipe which may be caused by the adhesion and accumulation of the polymer cake inside the pipe.

In the second segment of the heat exchanger, which may be termed as the segregation zone(B2), the vaporized solvent and the thickened cake of polymeric product become substantially separated. A rapid volumeric expansion engendered by the solvent vaporization produces a fully developed turbulent flow inside the tube.

In the last segment of the tubular heat exchanger, which may be termed as the pulverizing zone(B3), the fast flowing turbulent mixture of the vaporized solvent and the solid polymeric product produces a self-grinding effect: that is to say, the polymeric particles, as a result of collision against the tubular wall or collision among themselves, are pulverized into a fine powdery form, e.g., in sizes ranging from 5 to 20 μ. Such pulverization further enhances the extraction and removal of the residual solvent entrapped in the intersticial spaces of the polymeric particles.

This two-phase mixture of the gaseous solvent and the powdery polymer is then sent to the rotary vacuum dryer(C). The vaporized solvent is then recovered through a filter (F) within the dryer. The polymeric powder, which now contains only a fraction of the solvent residue, e.g., 6% by weight is dried through the normal operation of the rotary vacuum dryer. Since the polymeric product is now in the form of a fine powder, a quicker drying or removal of the residual solvent within a commercially acceptable level becomes possible. This inventive process is further demonstrated by way of the following example, which is given solely for the purpose of illustration and not as a limitation on the scope of the invention.

EXAMPLE

About 2 cubic meters of a slurry mixture, having the temperature of about 80° C., consisting of benzene (83%) and carboxypolymethylene (m.w.=one to four million; 17%:) was fed to a rotary vacuum dryer (internal vol=5.7 cubic meters). over a period of half an hour. The rotary vacuum dryer was operated at the jacket temperature of 105°–115° C. The data obtained from such drying are recorded in the second column of Table 1 hereof.

Another sample (2 cubic meters) of the identical slurry mixture was then passed, under a pressure of 2 kg/cm², through a $\frac{3}{4}''$-diameter, 30 m-long tubular heat exchanger heated at the jacket temperature of 105°–120° C. over a period of 2 hours; and, then, sent to the identical rotary vacuum dryer operated under the like conditions as in the previous case. The data obtained from this test are shown on the third column of Table 1.

TABLE 1

| | Rotary Vac. Dryer | Heated Pipe/Rotary Vac. Dryer |
|---|---|---|
| Time to feed slurry mixture to dryer | 4 m³/hr | 1 m³/hr |

| Drying Time (hr)* | Benzene Content (ppm) | Benzene Content (ppm) |
|---|---|---|
| 4 | — | 59,316 |
| 7 | 179,416 | 23,034 |
| 13 | 23,004 | 4,626 |
| 16 | 9,530 | 1,668 |
| 19 | 3,718 | 990 |
| 22 | 1,848 | 526 |
| 25 | 1,252 | — |

*The drying time was measured from the moment when the entire amount of slurry mixture(2 cubic meters) was fed to the dryer.

As can be seen from Table 1, in the case of utilizing the drying process of the present invention, it took less than 19 hours of drying time to reduce the level of benzene below 1,000 ppm; whereas, in the case of conventional drying, even a drying time in excess of 25 hours failed to reduce the benzene content to the 1,000 ppm level.

What is claimed is:

1. A process for drying a slurry mixture comprising a carboxyl containing polymer of vinylidene monomers having at least one terminal methylene group and polymerizing solvent which comprises:
    (1) passing said slurry mixture through one or a plurality of jacketed and preheated tubular heat exchangers arranged in parallel by employing a transfer means obtained by applying to said slurry mixture a pressure ranging from 0.5 Kg/cm² to 5 Kg/cm², wherein each of said jacketed tubular heat exchangers has an inner diameter ranging from $\frac{3}{4}''$ to $1\frac{3}{4}''$ and a length in excess of 20 meters and is heated at a temperature at or slightly above the glassification temperature (Tg) of said polymer in order to produce turbulent flow of a two-phase mixture of said polymer in a pulverized state and said solvent in a vaporized state; and, thereafter,
    (2) feeding said two-phase mixture to a rotary vacuum dryer wherein the pulverized polymer is further dried and the vaporized solvent is recovered through a filtering means.

2. The process of claim 1 wherein the inner diameter is in the range from ¼" to 1".

3. The process of claim 2 wherein the length is in the range from 20 to 60 meters.

4. The process of claim 3 wherein the inner diameter is in the range from ½" to ¾".

5. The process of claim 4 wherein the length is in the range from 25 to 40 meters.

6. The process of claim 1 wherein said pressure is in the range from 1 kg/cm² to 3 kg/cm².

7. The process of claim 6 wherein said pressure is in the range from 1 kg/cm² to 2.5 kg/cm².

8. The process of claim 1 wherein said jacket temperature is in the range from Tg to Tg+20° c.

9. The process of claim 8 wherein said jacket temperature is in the range from Tg to Rg+15° C.

10. The process of claim 1 wherein said carboxyl containing polymer of vinylidene monomers having at least one terminal methylene group is selected from the group consisting of linear and cross-linked polyacrylic acid, carboxypolymethylene and polymethacrylic acid.

11. The process of claim 10 wherein said polymer is carboxypolymethylene.

12. The process of claim 1 wherein said polymerizing solvent is selected from the group consisting of benzene, toluene, n-hexane, n-heptane, methylene chloride, methanol, trichlorotrifluoroethane and dichloroethane.

13. The process of claim 12 wherein said polymerizing solvent is selected from the group consisting of benzene, n-hexane, methanol, trichlorotrifluoroethane and dichloroethane.

14. The process of claim 13 wherein said solvent is benzene.

15. A process for drying a slurry mixture comprising carboxypolymethylene and benzene which comprises:
  (1) passing said slurry mixture through one or a plurality of jacketed and preheated tubular heat exchangers arranged in parallel by employing a transfer means obtained by applying to said slurry mixture a pressure ranging from 0.5 Kg/cm² to 5 Kg/cm² wherein each of said jacketed tubular heat exchangers has an inner diameter ranging from ⅜" to 1¾" and a length ranging from 20 to 60 meters and is heated at a temperature within the range between 105° C. and 120° C. in order to produce turbulent flow of a two-phase mixture comprising pulverized carboxypolymethylene and vaporized benzene; and, thereafter,
  (2) feeding said two-phase mixture to a rotary vacuum dryer wherein said pulverized carboxypolymethylene is further dried and said vaporized benzene is recovered through a filtering means.

16. The process of claim 15 wherein the inner diameter is in the range from ¼" to 1".

17. The process of claim 16 wherein the length is in the range from 25 to 40 meters.

18. The process of claim 17 wherein the inner diameter is in the range from ½" to ¾".

19. The process of claim 15 wherein said pressure is in the range from 1 kg/cm² to 3 kg/cm².

20. The process of claim 19 wherein said pressure is in the range from 1 kg/cm² to 2.5 kg/cm².

21. The process of claim 15 wherein said rotary vacuum dryer described in Step (2) is operated at a temperature ranging from 105° C. to 120° C.

* * * * *